(12) United States Patent
Pica

(10) Patent No.: US 9,823,369 B2
(45) Date of Patent: Nov. 21, 2017

(54) SYSTEM AND METHOD FOR CORRECTING NEAR SURFACE STATICS BY USING INTERNAL MULTIPLES PREDICTION

(71) Applicant: CGG SERVICES SA, Massy (FR)

(72) Inventor: Antonio Pica, Vanves (FR)

(73) Assignee: CGG SERVICES SAS, Massy (FR)

( * ) Notice: Subject to any disclaimer, the term of this patent is extended or adjusted under 35 U.S.C. 154(b) by 767 days.

(21) Appl. No.: 14/191,894

(22) Filed: Feb. 27, 2014

(65) Prior Publication Data
US 2014/0244178 A1 Aug. 28, 2014

Related U.S. Application Data

(60) Provisional application No. 61/770,592, filed on Feb. 28, 2013.

(51) Int. Cl.
*G01V 1/28* (2006.01)
*G01V 1/36* (2006.01)

(52) U.S. Cl.
CPC .............. *G01V 1/362* (2013.01); *G01V 1/364* (2013.01); *G01V 2210/56* (2013.01)

(58) Field of Classification Search
USPC ................................................ 367/38, 53, 73
See application file for complete search history.

(56) References Cited

U.S. PATENT DOCUMENTS

| 7,197,399 | B2 | 3/2007 | Matson et al. |
| 8,126,652 | B2 | 2/2012 | Aaron et al. |
| 8,139,440 | B2 | 3/2012 | Ferber et al. |
| 8,223,587 | B2 | 7/2012 | Krebs et al. |
| 2007/0032954 | A1 | 2/2007 | Moore et al. |
| 2007/0073488 | A1 | 3/2007 | Moore |
| 2007/0274153 | A1 | 11/2007 | Bisley et al. |
| 2009/0048784 | A1 | 2/2009 | Matson et al. |
| 2009/0092007 | A1* | 4/2009 | Kitchenside ........... G01V 1/282 367/38 |
| 2009/0288823 | A1 | 11/2009 | Baumstein |
| 2011/0131020 | A1 | 6/2011 | Meng |
| 2011/0317521 | A1* | 12/2011 | Dragoset, Jr. ............ G01V 1/36 367/53 |

(Continued)

OTHER PUBLICATIONS

B. Ke et al., "Wave Equation Multiple Modeling and Its Application to South China Sea Data", 71st EAGE Conference & Exhibition, Amsterdam, The Netherlands, Jun. 8-11, 2009, P151.

(Continued)

*Primary Examiner* — Lam Nguyen
(74) *Attorney, Agent, or Firm* — Patent Portfolio Builders PLLC

(57) ABSTRACT

Disclosed is a system and method for predicting internal multiples generators to correct near surface statics, by estimating a first timing or position associated with reflectors using internal multiple generators identified based on predictive deconvolution operators, estimating a second timing or position associated with the reflectors using the acquired seismic surface data, comparing the first timing or position with the second timing or position for each of the reflectors to determine a travel time delay associated with the reflectors, and correcting the acquired seismic surface data using the travel time delay.

12 Claims, 6 Drawing Sheets

(56) References Cited

U.S. PATENT DOCUMENTS

2012/0113750 A1     5/2012   Al-Momin et al.
2012/0253758 A1    10/2012   Lazaratos et al.

OTHER PUBLICATIONS

M.G. Retailleau et al., "Advanced 3D Land Internal Mutiple Modeling and Substraction, a WAZ Oman Case Study", 74th EAGE Conference & Exhibition incorporating SPE EUROPEC 2012, Copenhagen, Denmark, Jun. 4-7, 2012, Y014.
T.J. Ulrych et al., "The Output of Predictive Deconvolution", Geophysics, Mar. 1991, pp. 371-377, vol. 56, No. 3.
T.B. Youssef et al., "WRS Incorporation Methodology in Processing Flow", 5th North African Mediterranean Petroleum and Geosciences Conference & Exhibition, Tripoli, Libya, Mar. 28-30, 2011.

\* cited by examiner

SYSTEM AND METHOD FOR CORRECTING NEAR SURFACE STATICS BY USING INTERNAL MULTIPLES PREDICTION

PRIORITY INFORMATION

The present application claims priority under 35 U.S.C. §119(e) to U.S. Provisional Patent Application Ser. No. 61/770,592, filed Feb. 28, 2013, the entire contents of which are expressly incorporated herein by reference.

TECHNICAL FIELD

The embodiments relate generally to land seismic exploration systems and methods, and more specifically to systems and methods for correcting near surface statics by using internal multiples prediction.

BACKGROUND

Seismic waves generated artificially for the imaging of geological layers has been used for more than 50 years. The most widely used waves are by far reflected waves and more precisely reflected compressional waves. During seismic prospection operations, vibrator equipment (also known more generically as a "source") generates a seismic signal that propagates in particular in the form of a wave that is reflected on interfaces of geological layers. These waves are received by geophones, hydrophones, and/or other types of receivers, which convert the displacement of the ground resulting from the propagation of the waves into an electrical signal recorded by means of recording equipment. Analysis of the arrival times and amplitudes of these waves makes it possible to construct a representation of the geological layers on which the waves are reflected.

FIG. 1 depicts a seismic exploration system (system) 70 for transmitting and receiving seismic waves intended for seismic exploration in a land environment. At least one purpose of system 70 is to determine the absence, or presence of hydrocarbon deposits 44, or at least the probability of the absence or presence of hydrocarbon deposits 44. System 70 comprises a source consisting of a vibrator 71 operable to generate a seismic signal (transmitted waves), a plurality of receivers 72 (or geophones) for receiving seismic signals and converting them into electrical signals, and seismic data acquisition system 200 (that can be located in, for example, vehicle/truck 73) for recording the electrical signals generated by receivers 72. Source 71, receivers 72, and data acquisition system 200, can be positioned on the surface of ground 75, and interconnected by one or more cables 12. FIG. 1 further depicts a single vibrator 71, but it should be understood that source 71 can actually be composed of multiple or a plurality of sources 71, as is well known to persons skilled in the art.

In operation, source 71 is operated so as to generate a seismic signal. This signal propagates firstly on the surface of ground 75, in the form of surface waves 74, and secondly in the subsoil, in the form of transmitted ground waves 76 that generate reflected waves 78 when they reach an interface 77 between two geological layers. Each receiver 72 receives both surface wave 74 and reflected wave 76 and converts them into an electrical signal in which are superimposed the component corresponding to reflected wave 78 and the one that corresponds to surface wave 74, the latter of which is undesirable and should be filtered out as much as is practically possible.

An example of a vibratory source 71 is shown in FIG. 2. Source 71 can include base plate 88 that connects to rod 80. Rod 80 includes piston 82 inside reaction mass 84. Insulation devices 86 can be provided on base plate 88 to transmit weight 90 of vehicle 73 to base plate 88. Base plate 88 is shown in FIG. 2 as lying on ground 75. The force transmitted to ground 75 is equal to the mass of base plate 88 times its acceleration, plus the weight of reaction mass 84 times its acceleration. The weight of vehicle 73 (shown in FIG. 1) prevents base plate 88 from losing contact with ground 75. Many designs for vibratory sources 71 exist on the market, and any one of them can be used with the embodiments discussed herein.

The signals recorded by seismic receivers 72 vary in time, having energy peaks that may correspond to reflectors between layers. In reality, since many other layers 77, and especially the weather layer, or low-velocity-layer (LVL) 79 (shown in FIG. 3) can be moderately to highly reflective, some of the peaks correspond to multiple reflections or spurious reflections that should be eliminated before the geophysical structure can be correctly imaged. Primary waves 78 suffer only one reflection from an interface between layers of the subsurface (e.g., first reflected signal 78a). Waves other than primary waves are known as multiples, and more strictly, are events that have undergone more than one reflection. Typically, internal multiples, which occur when energy is reflected downward at an interface layer in the subsurface, have a much smaller amplitude than primary reflected waves, because for each reflection, the amplitude decreases proportionally to the product of the reflection coefficients of the different reflectors (usually layers or some sort). As shown in FIG. 3, discussed below, there are several ways for multiples to be generated.

For example, consider that seismic source 71 produces transmitted waves 76a-d that become two primary reflected waves, and two multiple waves. Primary transmitted wave 76b penetrates through both first and second subsurface layers 16a,b (referred to also as, e.g., the "sediment layer"), and becomes first reflected signal 78a that reaches first receiver 72a. Primary transmitted wave 76d becomes second reflected signal 78b, and also reaches receiver 72a. Each of reflected signals 78a,b represent true information about the underlying GAI and it is one of the primary goals of seismic signal processing to find and enhance these types of signals, and eliminate the influence, to the greatest extent possible, of multiples 51, as further discussed below. Primary transmitted wave 76a reflects off first interface layer 77a and then off weather layer 79, down again to layer 77a, and then up to surface 75. This type of multiple is known as a "peg-leg" multiple 51b. In FIG. 3, peg-leg multiple 51b is not shown as having been received by receiver 72a (in fulfillment of the dual purposes of clarity and brevity), though as one of skill in the art can appreciate it generally will be, becoming "noise" that should be filtered out to the greatest extent possible. Primary transmitted wave 76c reflects off second interface level 77b, bounces up and down again off first interface level 77a, then up off second interface level 77b to reach receiver 72a as simple multiple 51a. Internal multiple signals 51a,b, and primary reflected signal 78a,b all reach receiver 72a, but at different times. Thus, receiver 72b can receive at least several different signals from the same transmitting event.

Attempts have been made to correct for the deleterious effects of multiples on seismic data by using internal multiples predictions. For example, U.S. Published Patent Application No. 2102/0253758, entitled "Method of Wavelet Estimation and Multiple Prediction In Full Wavefield Inversion," describes a wavelet estimation method, allegedly advantageous for full wavefield inversion (FWI) of seismic data, which makes use of both the primary and multiple reflections in the data. The method uses an FWI algorithm to generate a subsurface model from primary reflections in a shallow layer before first arrival of multiple reflections. The model is then used to simulate multiples. The wavelet is subsequently modified such that the simulated multiples closely match the true recorded multiples. The simulated multiples may then be subtracted from the measured data thereby creating a deeper top layer of data substantially free of multiples, and the method may then be repeated to extend the subsurface model to a greater depth.

In addition, there is U.S. Published Patent Application No. 2011/0317521, entitled "Correcting Geometry Related Time and Amplitude Errors," which discloses a method for predicting a plurality of surface multiples for a plurality of target traces in a record of seismic data acquired in a survey area. The method includes selecting a target trace and identifying two or more desired traces for multiple prediction based on the target trace. After identifying the desired traces, the method identifies one or more recorded traces for each desired trace. Each identified recorded trace is described as being substantially close to one of the desired traces. The method then includes correcting the identified recorded traces for one or more geometry-related effects associated with the survey area and convolving the corrected recorded traces to generate a plurality of convolutions. After convolving the corrected recorded traces, the method then stacks the convolutions.

Such techniques do not, however, effectively correct for all of the anomalies found in recorded seismic data. For example, such techniques do not adequately account for some near surface statics, including especially travel-time anomalies in the weathered zone, which are very difficult to obtain and correct for by direct measurements. Near surface statics, as those of skill in the art can appreciate, relate to those effects associated with weathering, discussed below, and elevation. As those of skill in the art can appreciate, the weather zone, or low-velocity-layer, is a zone, usually between about 4 to 50 meters thick, which is characterized by not only low seismic velocities, but also velocities that can be highly variable.

There are several significant effects of the weathered zone in the context of the quality of the recorded seismic data. First, the absorption of seismic energy in the zone can be significant; second, the low velocity and changes in velocity can have a disproportionately significant effect on travel times; third, because of the low velocity, the wavelengths are shortened and therefore smaller features produce significant scattering and other noise; fourth the marked bend in velocity at the base of the weather zone sharply bends the seismic signal such that their travel is almost always nearly vertical through the zone, regardless of travel below the weather zone; and fifth, the very high impedance contrast at the base makes it a very good reflector of seismic energy.

Accordingly, it would be desirable to provide methods and systems for correcting for the effects of near surface statics, including travel-time anomalies, on acquired seismic data by using internal multiples prediction.

SUMMARY

An aspect of the embodiments is to substantially solve at least one or more of the problems and/or disadvantages discussed above, and to provide at least one or more of the advantages described below.

It is therefore a general aspect of the embodiments to provide systems and methods for correcting near surface statics by using internal multiples predictions that will obviate or minimize problems of the type previously described.

According to a first aspect of the embodiments, a method for predicting internal multiples generators to correct acquired seismic surface data includes the steps of: estimating a first timing or position associated with reflectors using internal multiple generators identified based on predictive deconvolution operators, estimating a second timing or position associated with the reflectors using the acquired seismic surface data, comparing the first timing or position with the second timing or position for each of the reflectors to determine a travel time delay associated with the reflectors, and correcting the acquired seismic surface data using the travel time delay.

According to a second aspect of the embodiments, a method for predicting internal multiples generators to correct acquired seismic surface data includes estimating a first timing or position associated with reflectors using internal multiple generators identified based on predictive deconvolution operators, estimating a second timing or position associated with the reflectors using the acquired seismic surface data, comparing the first timing or position with the second timing or position for each of the reflectors to determine a travel time delay associated with the reflectors, and correcting the acquired seismic surface data using the travel time delay.

According to other embodiments, systems for correcting acquired seismic surface data include one or more processors configured to perform the foregoing methods.

BRIEF DESCRIPTION OF THE DRAWINGS

The above and other aspects of the embodiments will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
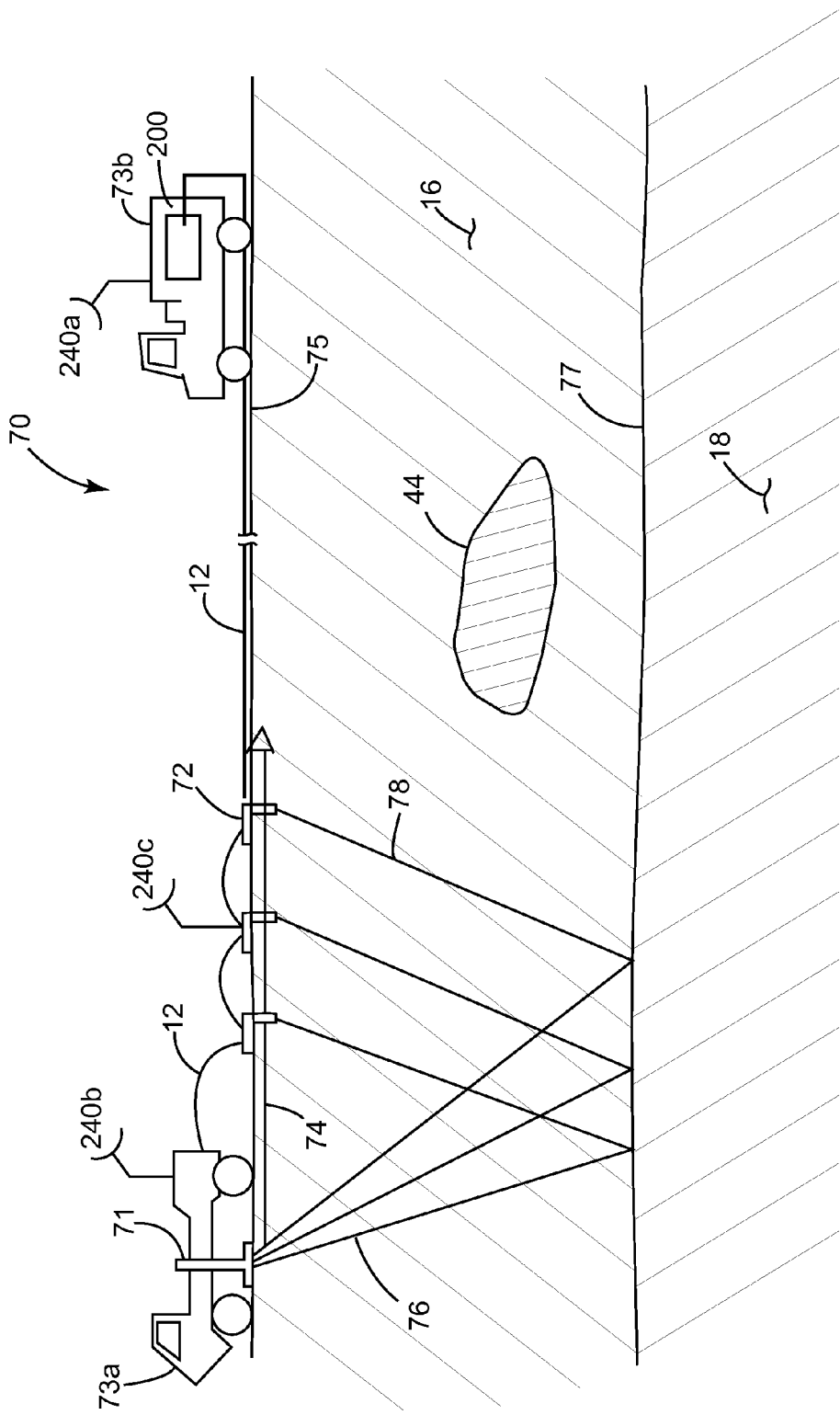
FIG. 1 depicts a system for transmitting and receiving seismic waves intended for seismic exploration in a land environment.
Figure 2:
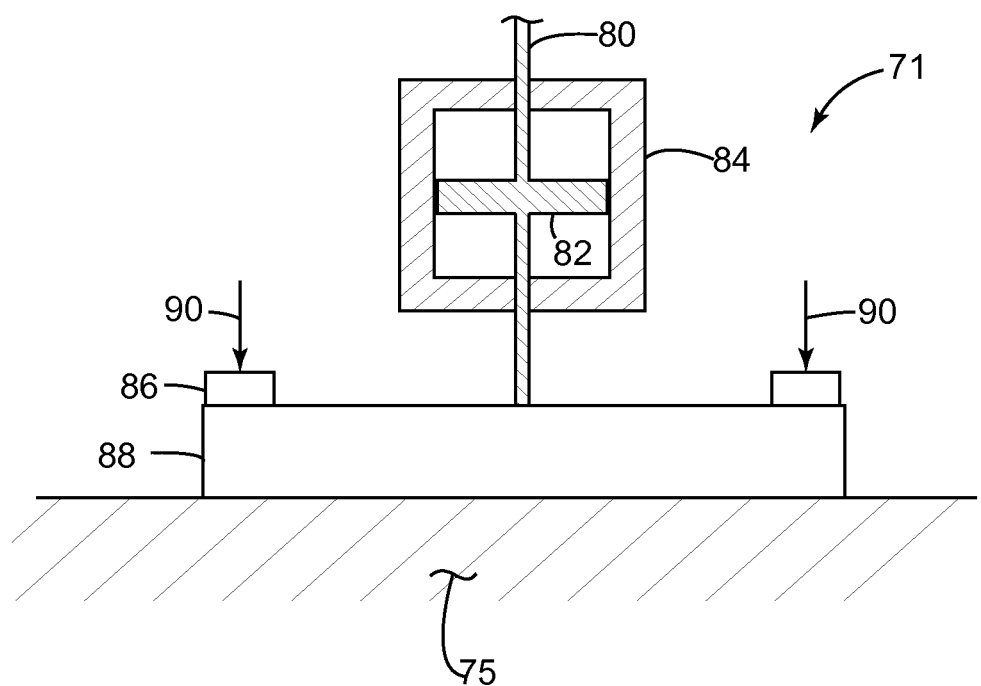
FIG. 2 illustrates a diagram of a vibratory source used in the system of FIG. 1.
Figure 3:
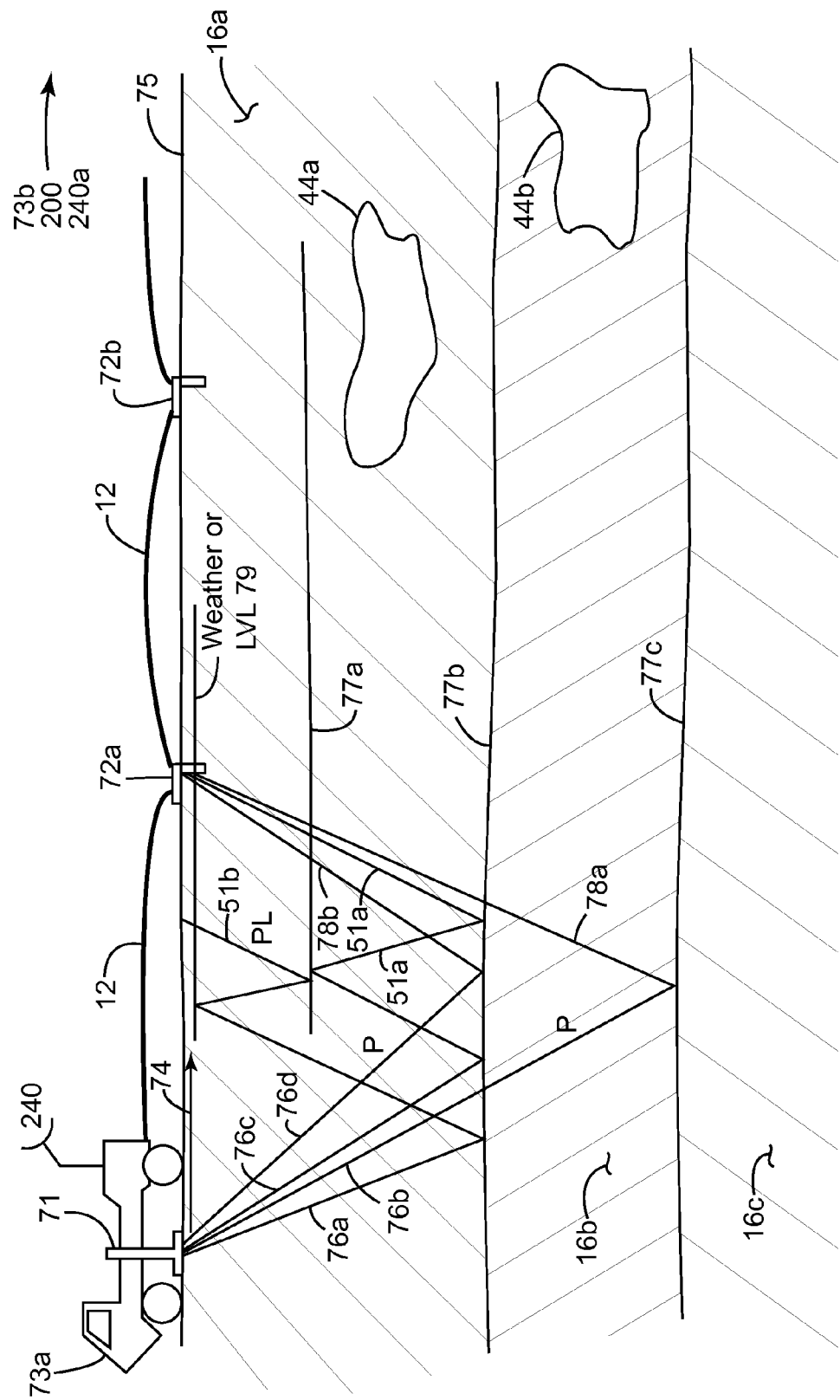
FIG. 3 illustrates a side view of the land seismic exploration system of FIG. 1 and pictorially represents transmitted, reflected, refracted and multiple seismic waves.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. It will be apparent to one skilled in the art, however, that at least some embodiments may be practiced without one or more of specific details described herein. In other instances, well-known components or methods are not described in detail or are presented in simple block diagram format in order to avoid unnecessarily obscuring the embodiments. The scope of the embodiments is therefore defined by the appended claims. The following embodiments are discussed, for simplicity, with regard to the terminology and structure of a land seismic exploration system. However, the embodiments to be discussed next are not limited to these systems but may be applied to other marine seismic exploration systems that are affected by determination of, and use of, near surface travel-time anomalies.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

According to the embodiments to be described below, the effects of near surface statics on the acquired seismic data can be compensated for by calculating a time travel delay associated with reflectors in the subsurface. The travel time delay can be determined by comparing a position (or equivalently a timing) associated with subsurface reflectors which position or timing are calculated in two different ways. The first way is to calculate the reflector position directly using the acquired seismic data. The second way is to calculate the reflector position indirectly using internal multiples predictor operators. The difference between the positions or timings calculated using these two techniques provides a compensating factor in terms of travel time delay that can be applied to the acquired seismic data to correct for the effects of near surface statics.

Figure 4:
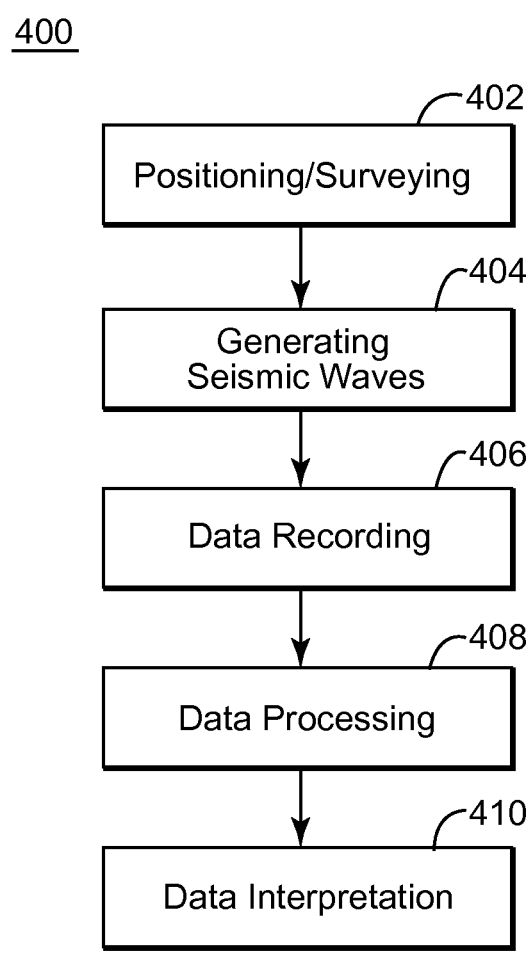
FIG. 4 illustrates a flow chart of a general method for seismic exploration.

Prior to discussing the details of these embodiments, it may be useful for the reader to understand seismic exploration or acquisition from a higher level to appreciate how the embodiments can be used. As generally discussed above, the main purpose of seismic exploration is to render the most accurate possible graphic representation of specific portions of the Earth's subsurface geologic structure (also referred to as a GAI). The images produced allow exploration companies to accurately and cost-effectively evaluate a promising target (prospect) for its oil and gas yielding potential (i.e., hydrocarbon deposits 44). FIG. 4 illustrates a general method for seismic exploration (method 400). Step 402 of method 400 involves positioning and surveying of the potential site for seismic exploration. In step 404, seismic signals or waves are generated or transmitted by one or more sources (e.g., vibrators).

In step 406, acquired seismic data is recorded, i.e., based upon received waves including the primary waves and multiples described above. In a first part of this step, receivers 14, 64 receive and most often digitize the data, and in a second part of the step 406, the data is transferred to a recording station. In step 408, data processing occurs. Data processing generally involves enormous amounts of computer processing resources, including the storage of vast amounts of data, multiple processors or computers running in parallel. The embodiments described below can be used as one of the many techniques used to refine the raw seismic data. Finally, in step 410, data interpretation occurs and results can be displayed, sometimes in two-dimensional form, more often now in three dimensional form. Four dimensional data presentations (a 3D plot or graph, over time (the fourth dimension)) are also possible, when needed to track the effects of other processes, for example.

Figure 5:
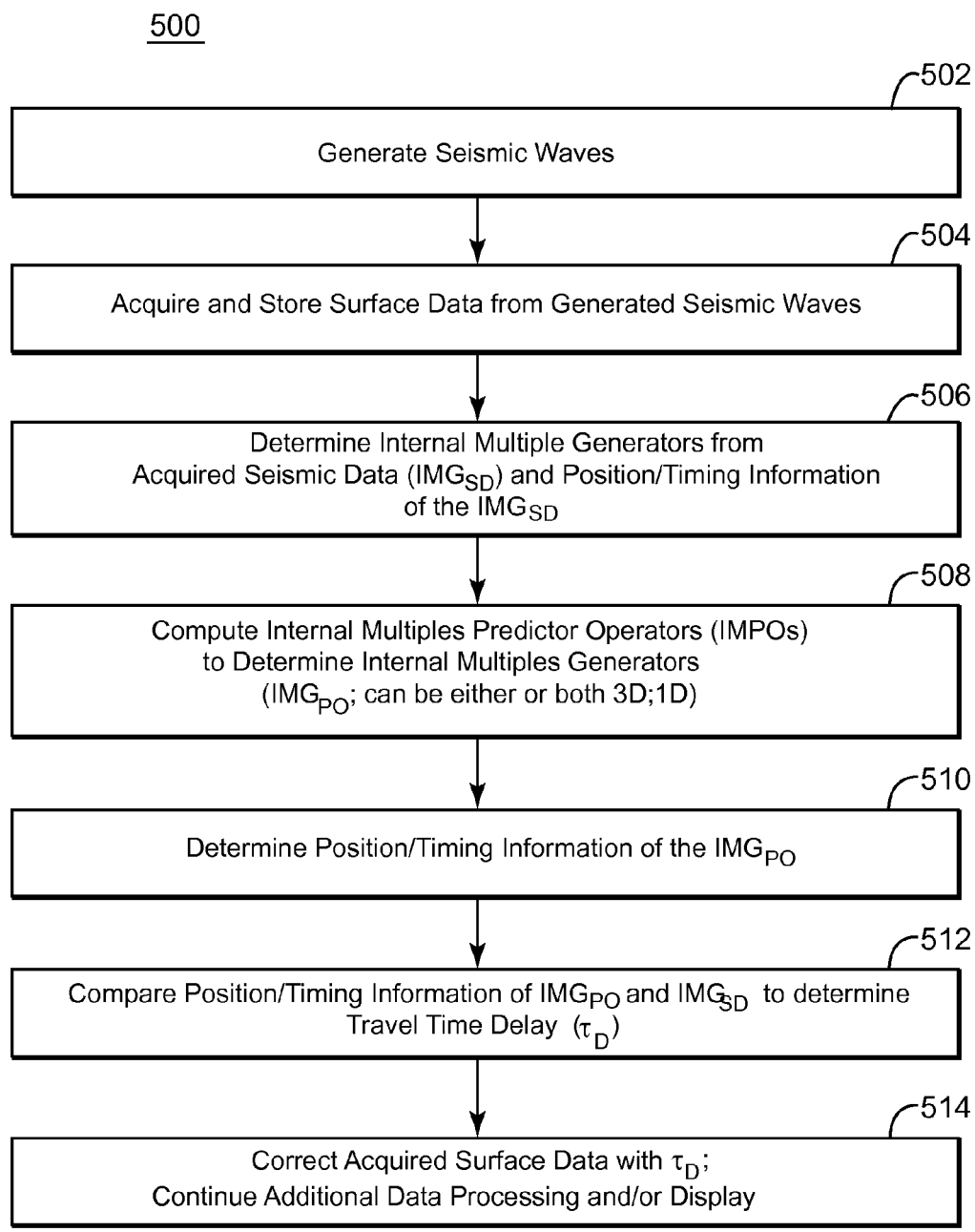
FIG. 5 illustrates a flow chart of a method for predicting internal multiples generators to correct for near surface statics according to an embodiment.

FIG. 5 illustrates a flow chart of method 500 for predicting shallow internal multiples generators to correct near surface statics according to an embodiment. Generally speaking, method 500 involves estimating the positions (equivalently the time that it takes for elastic waves to reach the positions, i.e., "timing") of deep reflectors (i.e., known, downward-reflecting, internal multiples generators) as they are revealed by predictive deconvolution (1D to 3D) operators. Those estimated deep reflector positions can then be compared to the positions of the same reflectors as they are determined based on the surface data sections, i.e., directly from the acquired seismic data. This comparison of reflector timing or position can be quantified by the comparison of the horizon pickings in each of both sections using one of three types of picking: manual picking, semi-automated picking, or automated picking. As those of skill in the art can appreciate, "horizons" can be considered individual stratigraphic layers. They are approximately horizontal surfaces and are frequently associated with a strong reflector in the seismic data. In cases where there is no strong reflector, extensive geophysical interpretation is often necessary to determine the exact nature of a particular horizon. Horizon picking, therefore, is the process of segmenting one or more horizons from a data volume.

The picking type can be changed between the three depending on the noise level in the acquired seismic data which can lead to missing a considered event. The operators of the system can review their data, notice sudden discontinuities which reveal a problem in the automated picking, thus leading to hand-made interpretations. The timing differences reveal the travel-time delay between the base of the strong shallow internal multiples generator reflector and the surface, and it represents the travel-times anomalies resulting from shallow heterogeneities above the strong shallow reflector, that can thus be used to correct the surface data records.

Thus, according to an embodiment, method 500 can be used for correcting near surface statics by using internal multiples predictions compared to actual surface data. According to a further embodiment, the comparison can be made if the main downward-reflections internal-multiples-generator is close to the surface, and if its shape and geometry are known or assumed to be known i.e., as generated from acquired surface data.

Method 500 for predicting internal multiples generators to correct near surface statics begins with step 502, wherein land-based seismic waves are generated by sources 71. In step 504, reflected waves 78, some primary, some a result of multiples, as well as ground waves 74, are acquired by receivers 72, processed and stored in system 200 (described in greater detail below).

In step 506, an initial set of internal multiple generators are determined from the surface data (the data acquired in step 504) and stored for comparison in step 512 of method 500. The internal multiple generators determined from surface data can be represented as $IMG_{SD}$. Further in step 506, positions of the $IMG_{SD}$ are also determined, and, as those of skill in the art can appreciate, positions of $IMG_{SD}$ can include timing information of the $IMG_{SD}$.

According to an embodiment, internal multiples prediction operators (IMPO) can then be determined using the acquired surface data itself in step 508 of method 500. As can be appreciated by those of skill in the art, whenever (and this generally is almost always the case) there are at least two reflectors in a GAI, the transmitted seismic waves will bounce between the two, creating primary reflections, and multiples, as discussed in greater detail above. Thus, the collected data always includes extra data that represents or corresponds to the multiples. IMPOs are mathematical operations, known to those of skill in the art, that process all of the acquired data and differentiate between that data which corresponds to primary reflections, and that data which corresponds to the multiple reflections. According to an embodiment, the IMPO will shift the data and attempt to match the data with what is believed or ascertained to be primary and multiples; the output, as its name implies, is a set of data that correlates to the "predicted" multiples. The mathematical operations are generally linear systems.

Determination of internal multiples prediction operators of internal multiples generators is known to those of skill in the art and, therefore, not further described in detail here. However there are a number of different ways and types of internal multiples prediction operators which can, alternatively or jointly, determined in step 508. For example, the internal multiples prediction operators can be computed in 3D by using multiples migration with a deconvolution imaging condition, or in 1D by bins, using either pre-stack data or post-stack data. Bins are known to be rectangular plots formed by pluralities of receivers or geophones laid out in a grid pattern. 1D, as those of skill in the art can appreciate, refers to the simplified assumption of a perfectly or near perfectly flat horizontal reflector, such that there are no or negligible dips in the reflector field. Dips, of course, are undulations of a reflector, i.e., a reflector whose depth varies over distance, which is generally but not always the case in most geographical areas of interest (GAI).

In another approach, 1D internal multiple prediction operators determined in step 508 can be internal multiple prediction pre-operators, calculated by predictive gapped deconvolution, estimated within a time window on zero offset data, or close to zero offset, or post-stack data where the suspected downward reflections internal multiples generator is not contained in that window. Such determinations are known to those of skill in the art. As further known and appreciated by those of skill in the art, deconvolution is a filtering process that removes a wavelet from the recorded seismic trace by reversing the process of convolution. An important application of deconvolution is predictive deconvolution in which a repeating signal (e.g. primaries and multiples) is shaped to one that doesn't repeat (primaries only). Further, predictive deconvolution suppresses multiple reflections and optionally alters the spectrum of the input data to increase resolution. Or, stated in another way, predictive deconvolution attempts to remove multiple effects, which can be predicted from knowledge of the arrival time of the primaries involving the same reflectors. For the reader interested in more details related to predictive deconvolution, she or he is referred to the article entitled "The Output of Predictive Deconvolution", to Ulrych and Matsuoka, in Geophysics Vol. 56, No. 3, p. 371-377 (March 1991), the disclosure of which is incorporated here by reference.

According to a further embodiment, method 500 includes the use of internal multiples prediction operators (IMPOs) that are large enough to build an image of the subsurface reflectors with respect to the strong internal multiples generator. It is known by those of skill in the art to use internal multiples prediction operators that are relatively short, e.g., on the order of between about 200 milliseconds (ms) to about 300 ms. However, according to an embodiment, method 500 creates or develops internal multiples prediction operators on the order of between about 600 to about 800 ms. Use of a larger internal multiples prediction operator permits a greater degree of freedom to find the internal multiples generators. Further, use of larger internal multiples prediction operators permits method 500 to eliminate the need to use long estimation windows that measure internal multiple generators.

Following step 508, wherein internal multiples prediction operators were formed, method 500 proceeds to step 510, wherein internal multiples prediction operators are used to create, or predict positions of a plurality of internal multiples generators. The internal multiples generators predicted from the internal multiples prediction operators determined in step 508 are represented as $IMG_{PO}$. In step 512, method 500 compares, on a section-by-section (bin) basis (or volume (3D)) the reflectors' positions (i.e., the internal multiples generators) determined by method steps 508 and 510 (i.e., from the determined internal multiples prediction operators; $IMG_{PO}$) to the position of reflectors as determined from the regular surface data in method step 506, $IMG_{SO}$. According to a further embodiment, the comparison of internal multiple generators in method step 512, $IMG_{PO}$ to $IMG_{SD}$, is actually a comparison of timing differences.

The timing difference between $IMG_{SD}$ and $IMG_{PO}$ represents the travel-time delay between the recording surface (i.e., the location of the plurality of the receivers 72) and the base of the strong downward reflections internal multiples generator. Determination of the travel-time delay, $\tau_D$ or travel-time difference (i.e., the output of step 512), allows users of method 500 to correct for the effects of near surface statics in the surface data, providing a clearer image of the actual underground GAI. In step 514, additional processing and/or display of corrected acquired surface data can occur.

According to a further embodiment, the position and timing of $IMG_{SD}$ can be found by other means as well. For example, if the position and timing of the $IMG_{SD}$ is known by other means, either because it is assumed to be a flat reflector, or because its position and timing is known from up-holes information (up-holes, as known by those of skill in the art, are receivers located at the top of drilled hole or well for the purpose of data collection), or because its position and timing is known by using WRS data, method 500 can make use of the position and timing of $IMG_{SD}$ determined in those aforementioned manners to also extrapolate the travel-time anomalies (i.e., the travel-time delay, $\tau_D$) of other places of the surface data resulting from the near surface (above the strong reflector) heterogeneities correct for these travel-time anomalies. According to a further embodiment, the determination of the $IMG_{SD}$ by other means can be used to supplement the travel-time differences found by use of the $IMG_{SD}$ as determined in method step 506 of method 500.

For example, as those of skill in the art can appreciate, weathering reflection survey (WRS) is a method that allows estimating the velocity and the thickness of the weathered layer, or low velocity layer. As mentioned above, the weathered (low velocity) layer is a layer wherein because gas (air or methane from decomposing vegetation) fills some void, the velocity of the seismic signal is lower than the velocity of the same signal in water or land. Typically, such velocities are not only low, but highly variable, and, by way of example only, range from about 250 to about 1000 m/s, and the layers themselves are typically about 4 to about 50 meters in thickness. The WRS method is designed to simulate small trace spacing with the source using the production spread to detect the reflection from the first consolidated layer. The usual acquisition approach is to use a single vibrator source at 2.5 m intervals, recorded on a normal production spread.

Figure 6:
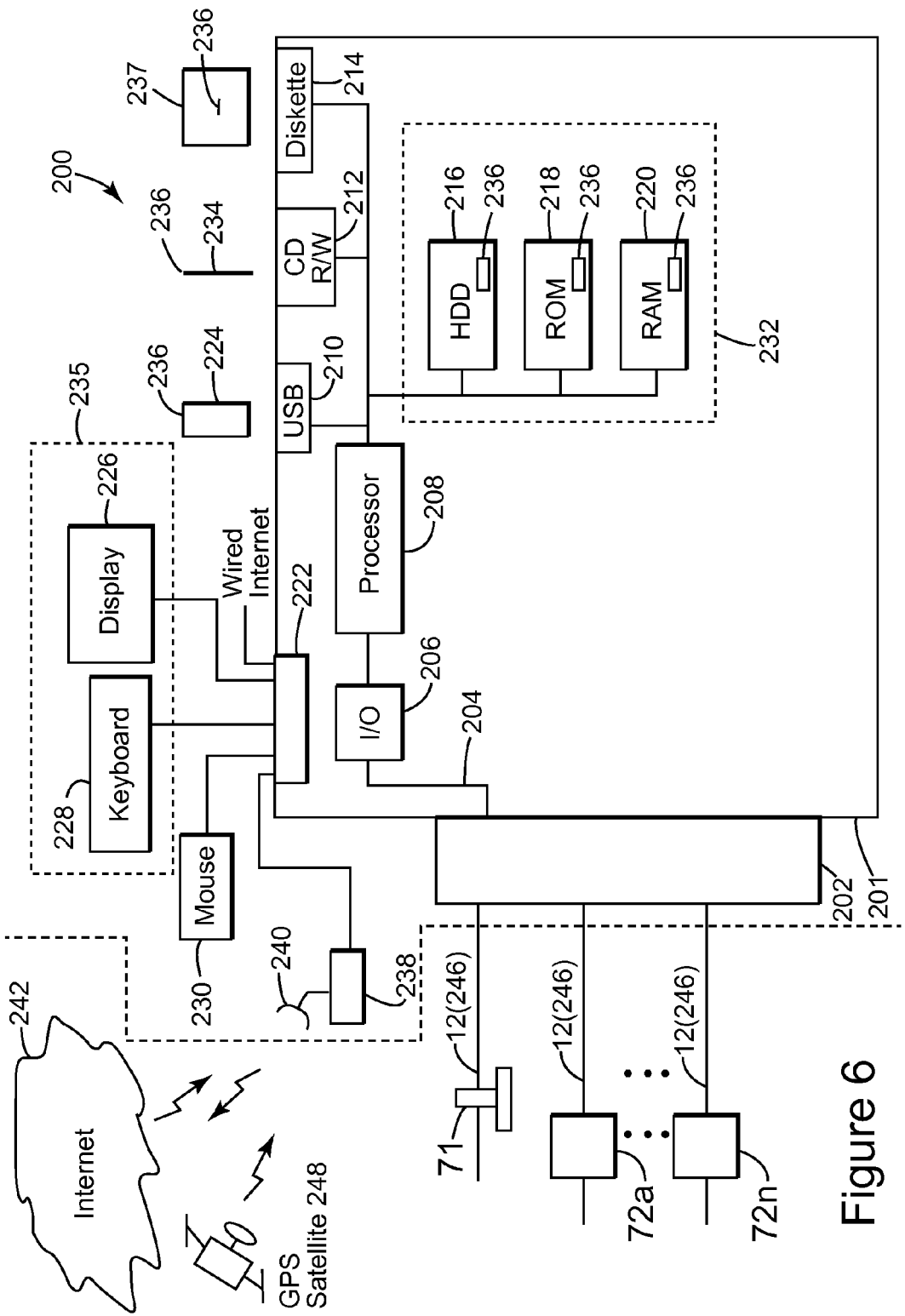
FIG. 6 illustrates a seismic data acquisition system suitable for use to implement a method for predicting internal multiples generators to correct for near surface statics according to an embodiment.

The methods described above can be implemented as part of a seismic acquisition or processing system. For example, FIG. 6 illustrates a seismic data acquisition system (system) 200 suitable for use to implement methods for predicting internal multiples generators to correct near surface statics according to an embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 235, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 235, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238 (to receive signals from GPS satellites 248), to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of vehicles 73a,b, via one or more networks. Server 201 may be part of a larger network configuration as in a global area network (GAN) (e.g., internet 242), which ultimately allows connection to various landlines.

According to a further embodiment, system 200, being ostensibly designed for use in seismic exploration, will interface with one or more sources 71 and one or more receivers 72. These, as previously described, are attached to cables 12. As further previously discussed, sources 71 and receivers 72 can communicate with server 201 either through electrical cable 12, or via a wireless system that can communicate via antenna 240 and transceiver 238 (collectively described as communications conduit 246).

According to further embodiments, user console 235 provides a means for personnel to enter commands and configuration into system 200 (e.g., via a keyboard, buttons, switches, touch screen and/or joy stick). Display device 226 can be used to show: visual representations of acquired data; source 71 and receiver 72 position and status information; survey information; and other information important to the seismic data acquisition process. Source and receiver interface unit 202 can also communicate bi-directionally with sources 71 and receivers 72 via communication conduit 246 to receive land seismic data and status information related to sources 71 and receivers 72, and to provide excitation signals and control signals to source 71 and receivers 72.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement method 500 for predicting internal multiples generators to correct near surface statics according to an embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 224). These storage media may be inserted into, and read by, devices such as the CD-ROM drive 212, disk drives 214, 216, among other types of software storage devices.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for correcting for the effects of near surface statics in seismic data. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A method for processing seismic data to correct for effects associated with near surface statics, comprising:
    determining a position of each of one or more internal multiple generators ($IMG_{SD}$) using acquired seismic surface data;
    determining one or more internal multiple predictor operators (IMPO) using said acquired seismic surface data;
    using said one or more IMPOs to determine corresponding one or more estimated internal multiple generators ($IMG_{PO}$);
    determining a position of each of said one or more estimated $IMG_{PO}$;
    comparing corresponding positions or timings of corresponding $IMG_{SD}$ and estimated $IMG_{PO}$ to determine a travel-time delay; and
    correcting with said travel-time delay, for said effects of the near surface statics, said acquired seismic surface data.

2. The method according to claim 1, wherein the step of determining one or more IMPOs comprises:
    determining one or more 3D IMPOs based on said acquired surface data using multiples migration with a deconvolution imaging condition.

3. The method according to claim 1, wherein the step of determining one or more IMPOs comprises:
    separating acquired surface data into a plurality of bins; and
    determining one or more 1 D IMPOs based on said acquired surface data according to each of said plurality of bins.

4. The method according to claim 3, wherein said acquired surface data is pre-stack data.

5. The method according to claim 3, wherein said acquired surface data is post-stack data.

6. The method according to claim 3, wherein said one or 1 D IMPOs comprise:
    internal multiple prediction pre-operators, determined by predictive gapped deconvolution, estimated within a first time window for each of said plurality of bins.

7. The method according to claim 6, wherein said one or more 1 D IMPOs are determined with zero offset pre-stack data.

8. The method according to claim 6, wherein said one or more 1 D IMPOs are determined with non-zero offset pre-stack data.

9. The method according to claim 6, wherein said one or more 1 D IMPOs are determined with post-stack data and wherein said corresponding $IMG_{PO}$ determined with said acquired surface data is not contained within a corresponding window of said post-stack data.

10. The method according to claim 1, wherein each of said determined IMPOs is between about 600 ms to about 800 ms, such that each of said determined IMPOs eliminates determination of long estimation windows that measure said IMGs.

11. The method according to claim 1, wherein said step of determining IMPOs comprises:
    determining said IMPOs using statistical methods.

12. The method according to claim 11, wherein
    said $IMG_{PO}$ determined according to statistical methods represents one strong buried reflector such that said corresponding IMPO represents a reflectivity series with respect to said one strong buried reflector multiplied by the negative of a reflection coefficient of said one strong buried reflector.

* * * * *